United States Patent [19]

Breton et al.

[11] 3,917,149

[45] Nov. 4, 1975

[54] PROCESS OF PREPARING EMBOSSED SINTERED ARTICLES OF MANUFACTURE

[75] Inventors: Ernest J. Breton; Jack D. Wolf; Dexter Worden; John T. Bailey, all of Wilmington, Del.

[73] Assignee: Mallory Composites, Inc., Indianapolis, Ind.

[22] Filed: Sept. 15, 1972

[21] Appl. No.: 289,258

[52] U.S. Cl. .............. 228/124; 228/164; 228/243; 228/248; 228/DIG. 903; 29/182.1; 29/182.3; 29/182.8; 29/420.5
[51] Int. Cl.$^2$ ......................................... B23K 31/02
[58] Field of Search ............. 219/73, 76, 117, 243; 29/182.2, 182.7, 191.2, 472.7, 472.9, 473.1, 420.5; 75/203, 208 R, 211, 212, 213, 216, 214; 117/71, 75, 130, 131; 156/62.2, 62.8, 89, 155, 275, 278; 214/49, 50, 149

[56] References Cited
UNITED STATES PATENTS

| | | | |
|---|---|---|---|
| 2,456,262 | 12/1948 | Fields.................................. | 18/55 |
| 2,593,582 | 4/1952 | Lontz et al......................... | 260/33.6 |
| 2,845,660 | 8/1958 | Peiler.................................. | 18/58.6 |
| 2,866,886 | 12/1958 | Koehring......................... | 219/117 R |
| 3,086,860 | 4/1963 | Moutard............................. | 75/222 |
| 3,155,502 | 11/1964 | Brown................................ | 75/214 |
| 3,185,566 | 5/1965 | Golmiche............................ | 75/212 |
| 3,281,511 | 10/1966 | Goldsmith........................... | 264/49 |
| 3,315,020 | 4/1967 | Gore .................................. | 264/120 |
| 3,365,785 | 1/1968 | Volyi ................................. | 29/420.5 |
| 3,395,049 | 7/1968 | Thompson ......................... | 136/122 |
| 3,486,961 | 12/1969 | Adams............................... | 156/306 |
| 3,556,161 | 1/1971 | Roberts.............................. | 138/141 |
| 3,717,442 | 2/1973 | Knapp............................... | 75/208 R |
| 3,743,556 | 7/1973 | Breton et al...................... | 29/472.7 X |
| 3,778,586 | 12/1973 | Breton et al...................... | 29/472.9 X |

FOREIGN PATENTS OR APPLICATIONS

| | | | |
|---|---|---|---|
| 252,771 | 7/1964 | Australia........................... | 75/208 R |
| 887,573 | 12/1971 | Canada............................. | 75/208 R |
| 1,198,616 | 7/1970 | United Kingdom................. | 75/208 |
| 46-5927 | 2/1971 | Japan................................ | 75/208 R |

*Primary Examiner*—Ronald J. Shore
*Attorney, Agent, or Firm*—Charles W. Hoffmann; Robert F. Meyer; Donald W. Hanson

[57] ABSTRACT

Process of preparing embossed sintered articles of manufacture by mechanically working a mixture of solid particulate material selected from the group consisting of ceramics, metals, intermetallic compounds, plastics or combinations thereof and a particulate polytetrafluoroethylene (PTFE) resin to form a nonwoven cloth, folding the cloth, mechanically working the folded cloth along a crosswise axis to the direction of work in forming the initial cloth, forming in the resulting cloth the pattern to be replicated and finally heating the cloth while on a substrate to a temperature sufficient to sinter said solid particulate material.

The process is useful in the preparation of embossed sintered articles of manufacture including tools, printing rolls and others.

Also disclosed is a process of preparing an article having an embossed pattern on at least one surface thereof which comprises mixing and working solid particulate braze alloy material and particulate polytetrofluorethylene resin to provide a first cloth, mixing and working solid particulate filler material and particulate polytetrafluoroethylene resin to provide a second cloth, forming a surface of the cloth containing filler material into a pattern to be replicated, and heating the cloths while contiguous to each other to a temperature sufficient to drive off polytetrofluoroethylene and infiltrate braze alloy into the cloth containing filler material by melting braze alloy to provide an article having an embossed pattern on a surface thereof.

11 Claims, No Drawings

PROCESS OF PREPARING EMBOSSED SINTERED ARTICLES OF MANUFACTURE

In accordance with this invention it has been found that sintered articles having an embossed pattern on at least one surface therof to a high degree of replication can be prepared by carrying out the process which comprises a. mixing a solid particulate material and a particulate polytetrafluoroethylene resin,
b. mechanically working said mixture until the polytetrafluoroethylene fibrillates and the resulting fibrils interconnect and entrap said solid particulate material to provide a non-woven cloth having handleability and flexibility,
c. folding the cloth of step (b),
d. mechanically working the folded cloth of step (c) along a crosswise axis to the direction of working of step (b),
e. forming in the cloth of step (d) the pattern to be replicated,
f. heating the cloth of step (e) while on a substrate to a temperature sufficient to sinter said solid particulate material.

Mechanical working and cloth preparation is in accordance with U.S. Pat. No. 3,864,124 of Ernest J. Breton, Jack D. Wolf and Dexter Worden. This comprises rolling, ball milling, stretching, elongating, spreading, calendering and the like a mixture of the PTFE and particulate material to form a non-woven cloth. The mechanical working causes the PTFE to become fibrillated and the PTFE resulting fibrils to entrap and interconnect the individual particles of the particulate material. The cloth is of adequate strength to be readily handled. It is also quite flexible and has the drapability of cloth. Thus it is more aptly described as a non-woven cloth instead of a sheet or film. Cross-rolling with pressure rollers of a ball milled or mulled mixture is a preferred method of mechanically working the mixture to make the final cloth article. That is preferably the mixture is (1) ball milled, (2) formed into a non-woven cloth by pressure rolling, (3) folded, and (4) cross-rolled as in step (d) above. Preferably the pressure rolls are used, heated at about 25° to 200°C or higher and, more preferably, at 80° to 150°C. Generally at least one of the pressure rolls has a diameter of 0.5 to 8 inches or larger and, preferably, 1 to 6 inches and more preferably, 1 to 3 inches.

The pattern may be formed in the cloth (step e above) by any desired means, including e.g. pressing, rolling, cutting.

Where the pattern is to be affixed to a substrate, the pattern may be formed in the cloth while on said substrate, or it may be formed in the cloth and the cloth subsequently transferred to the substrate on which the pattern is to be affixed.

It is quite surprising that the embossings of this invention can be made and carried through the sintering phase and still give the patterns, particularly in such a high degree of replication. This element of surprise is even greater with respect to replication of the more delicate and intricate patterns as that of a file or coin.

Embossing as used herein means shaping a surface with e.g. a die, chisel or other shaping tool to form a pattern, design or configuration irrespective of its position relative to the surface of the finished articles on which it is made or affixed, e.g. whether it is raised above or recessed below said surface.

Sintering as used herein means metallurgical bonding through solid and liquid state diffusion as well as brazing by a liquid metal. That is sintering as used herein includes fusion and melting.

The term particulate material as used herein excludes PTFE, unless otherwise clearly shown.

The fibrillable PTFE polymer used in the process of this invention includes the high molecular weight polytetrafluoroethylene resins produced by emulsion polymerization. These PTFE polymers have a broad molecular weight range of about 10 to 20 million and are commercially available products. The preparation of these polymers, which is described in U.S. Pat. No. 2,510,112, U.S. Pat. No. 2,587,357 and U.S. Pat. No. 2,685,707 involves well-known emulsion polymerization techniques wherein tetrafluoroethylene under pressure in water containing an emulsifying agent, is reacted with a water soluble free radical catalyst. The emulsion produced is coagulated, washed and then dried. The average particle size of the polymer is about 50 to 560 microns; polymer having larger or smaller average particle size is operative. The PTFE to make the fibril containing composition is commercially available from E. I. duPont deNemours & Company, Wilmington, Delaware, as Teflon 6C, 6, 6H, 3264 or the like (unsintered).

The solid particulate materials applicable herein are those disclosed in the above-identified copending application. They include material selected from the group consisting of ceramics, metals, intermetallic compounds, plastics or combinations thereof.

The powdered ceramic materials which can be used in this invention are those which can be fused or sintered at temperatures of 500° to 2000°C. and include soda glass, porcelain, thoria, titania, alumina, rare-earth oxides, zirconia, barium titanate, beryllium oxide, mangesium oxide and the like and mixtures of these materials. Ceramic powders usable herein are further described in Levin, Phase Diagram for Ceramists, American Ceramic Society, Inc., Columbus, Ohio, 1964.

The solid particulate material can be any of the metals, semi-metals, metalloids, alloys or intermetallic compounds. For example, it can be an element of atomic number 4, 5, 6, 12–14, 20–33, 38–51, 56–79, 81–83, 88, 90 and 92 such as lead, boron, diamond, graphite, iron, cobalt and the like. The particulate material can be alloys of these elements and combinations of the elements and alloys. The particulate material can include solid solutions, such as copper-nickel mixtures containing 1% to 99% copper in nickel, copper-zinc with up to about 35% zinc, copper-silicon containing up to 4% silicon; and two phase alloys, reactive and refractory metals such as titanium and its alloys such as titanium-aluminum, copper-titanium, vanadium-titanium or titanium-aluminum mixed with other metals such as manganese or tin, nickel based alloys. These compositions are described in Robert M. Brick, Structure and Properties of Alloys, 3rd. Edition, McGraw-Hill Book Company, New York, 1965.

Intermetallic compounds include borides, nitrides, carbides and silicides and comprises compounds of metals and semi-metals with boron, carbon, silicon and nitrogen and, for example are TiC, WC, $W_2C$, SiC, NiB, silicon, nitride, $MoSi_2$, and the like. These materials are also commonly called abrasives. Intermetallic compounds preferred in this invention are those sintering above 400°C. These are described in Hansen, Constitution of Binary Alloys, McGraw-Hill, New York, 1958 and Elliott, First Supplement of Hansen's Constitution of Primary Alloys, McGraw-Hill, New York, 1965.

Plastics which can be used are those in the form of particulates that can be fabricated by heating. They include polyamides such as polyhexamethyleneadipamide, poly(bismethylcyclohexylene) dodencandioamide, poly(caproamide) and the like; polyimides such as poly[bis(oxdiphenylene)pyromellitimide)], poly(bisphenylenepyromellitimide), poly(bis(thiodiphenylene)bis(oxyphthalimide) and the like; fluoropolymers such as fluorinated ethylene/-propylene,-polytetrafluoroethylene produced by suspension polymerization poly(trifluorochloroethylene) and the like, aldehyde polymers such as polyoxymethylene, polychloral and the like polycarbonates such as bisphenol-A carbonate, ethylene glycol carbonate and the like; polyester such as poly(ethylene terephthalate), acrylics such as poly(mathylmethacrylate); cellulosics such as trimethylcellulose, silicones and vinyls.

The solid particulate material can be in the form of acicular, or irregular particles or in the form of flakes or, and preferably, a spherical configuration.

The following examples illustrate specific embodiments of this invention.

EXAMPLE 1

PTFE cloth filled with stainless steel was made in the following manner. 150 grams of 10 micron size 316 L stainless steel powder was ball milled with 2.2 grams of PTFE (DuPont 6C Teflon) for 2 hours in a 1 quart steel can containing 12 one-half inch ceramic grinding media.

The ball milled mixture was wrapped in aluminum foil and rolled once with 6 inch diameter rolls heated to 150°C and set ⅛ inch apart. The rolled mixture was unwrapped, folded upon itself, rotated 90° and rewrapped. This was rolled again. At this stage the rolled mixture has sufficient strength to be removed from its wrapper. The cloth was folded upon itself rotated 90° and rerolled. This operation was repeated for a total of 6 rolls to develop a pliant coherent cloth.

The resulting filled PTFE cloth was rolled in the same heated rolls in 3 passes to 0.050 inch thickness.

Into the surface of a 1 inch square of the 0.050 inch thick cloth placed on a flat surface, a coin with a bust in relief was hand pressed. Upon removal, the reliefed surface of the coin was accurately replicated in the stainless steel filled PTFE cloth. The resulting embossed cloth was given the following heat treatment in an electrically heated, 2½ inch tube furnace.

| Temperature °C | Time at Temperature Minutes | Atmosphere, % |
|---|---|---|
| 220 | 20 | 50 H$_2$+50 N$_2$ |
| 420 | 10 | 100 H$_2$ |
| 540 | 10 | 100 H$_2$ |
| 640 | 10 | 100 H$_2$ |
| 1100 | 90 | 100 H$_2$ |
| 200 | 20 | 100 H$_2$ |

The product of this operation was a metallurgically bonded square of stainless steel 0.045 inch thick with the pattern of the coin accurately replicated in one surface. The PTFE was removed in the 540°C and 640°C hold temperatures. Lateral shrinkage was 5.2% in both directions.

EXAMPLE 2

A PTFE cloth filled with minus 325 mesh tungsten carbide was made as follows.

274 grams of minus 325 mesh tungsten carbide bonded with 6% by weight cobalt was ball milled for 45 minutes with 3.3 grams of PTFE (DuPont Teflon 6C) in a 1 quart steel can with 12 one-half inch steel balls. This mixture was converted into a 0.050 inch thick cloth by the procedure given in Example 1. After cross rolling 6 times as in Example 1, the cloth was very soft and drapable.

A PTFE cloth filled with Ni/Cr brazing alloy (Ni 81.5%, Cr 15%, B 3.5% by weight) was made by the following procedure. 151 grams of minus 325 mesh Ni/Cr brazing alloy was milled for 30 minutes with 1.45 grams of PTFE (DuPont Teflon 6C) in a 1 quart steel can containing 12 one-half inch steel balls. This was converted into flexible cloth by the rolling procedure given in Example 1 during which it was cross rolled six times. The thickness was reduced by the procedure of Example 1 to 0.039 inches.

A 1 inch × 2 inches × 1/16 inch steel gripper plate was overlaid on one side with PTFE cloth containing the brazing alloy. Directly upon and aligned with this layer of braze alloy the PTFE cloth containing the tungsten carbide was placed, thus forming a 3-layer sandwich. Shellac was used between the layers to hold the sandwich together.

A woven screen having 18 openings per linear inch was rolled into the surface of the carbide layer affixed to the steel plate through the brazing alloy layer. Removal of the screen gave the pattern of the screen embossed into the carbide layer. The embossed assembly was placed in a horizontal position in a 2.5 inch electrically heated tube furnace with the carbide and brazing alloy layers up and subjected to the following heating sequence.

| Temperature °C | Time at Temperature Minutes | Atmosphere, % |
|---|---|---|
| 150 | 5 | 100 H$_2$ |
| 400 | 5 | " |
| 650 | 10 | " |
| 1020 | 30 | " |
| 1150 | 15 | " |
| 150 | 20 | " |

The product of this entire operation was the steel gripper plate with a layer of metallurgically bonded tungsten carbide on one side having the pattern of the screen embossed into its surface. The wear resistance and gripping action were excellent.

EXAMPLE 3

A strip of steel 1 inch × 4 inches × ⅛ inch was overlaid on one side first with 0.039 inch thick PTFE cloth filled with brazing alloy and then 0.050 inch thick PTFE cloth filled with a filler such as minus 325 mesh tungsten carbide bonded with 6% by weight cobalt as described in Example 2. Also the composition of the cloths and process of making were the same as in Example 2. The PTFE was DuPont Teflon 6C. A file having 20 serrations per linear inch was pressed into the surface of the carbide using a mechanical vise. After removal of the file the assembly with the embossed file pattern was heat treated by the schedule given in Example 2.

The resulting product was a carbide file having an ordered array of cutting edges. It was used to file wood, plastic and metal.

The particle size of the solid particulate material may vary considerably. For instance particles, e.g. cobalt-bound tungsten carbide (carbide), having a diameter of about 0.1 to 300 microns give good results. The selection of particle size depends on the degree of resolution desired of the embossed object, pattern or configuration. In general, preferably the diameter of the solid particulate material will be about 25% or less of the desired resolution. Thus, if the spacing between the raised lines of the pattern to be replicated are 500 microns, the diameter of the solid particulate material (e.g. carbide) desirably will be about 125 microns or less.

The ratio by volume of cobalt-bound tungsten carbide (carbide) or other solid particulate material to brazing alloy can vary appreciably.

Maximum strength of embossed parts made, for example by infiltrating carbide particles or other particulate material with a brazing alloy, is achieved when the brazing alloy is present in an amount to fill all of the voids in the carbide layer. If the embossed carbide is to be metallurgically bonded to a substrate then a slight excess of brazing alloy is used to braze the carbide to the substrate.

If porosity in the embossed carbide or other particulate material part is desired, the amount of brazing alloy used is adjusted to be less than the void volume in the carbide layer. One will want some porosity to carry a lubricant or ink for applications where surface lubrication or printing is involved.

A large excess of brazing alloy over that required to fill the void space in the carbide or other particulate material layer results in leveling of the embossed pattern with brazing alloy. This can occur by the brazing alloy filling in the valleys and rounding the raised edges of the embossed pattern.

It is preferred to place the brazing alloy on the opposite side of the layer that is being embossed. This stems from the desire to minimize the collection of residual brazing alloy in the pattern. This is why the brazing alloy, e.g., preferably is placed between the carbide or other layer to be embossed and the steel or other substrate.

Porosity of the PTFE filled cloth with a filler such tungsten carbide (carbide) or other particulate material varies typically between 30 to 55 volume percent. This is dependent upon the size, shape and size distribution of the carbide particles used to make the sheet. Large particles of uniform size lead to high porosities of the order of about 55 volume percent. The distribution of large and small particles can be adjusted to reduce void volume to about 30 volume percent or less. Acicular or fibrous particles can result in void volumes of 60 percent and higher. Enough is known such as the art of particle packing to select size, shape and distribution of particles to achieve the void volume desired.

The degree of pliancy needed to accept and retain an embossed pattern is dependent upon the depth and resolution of embossing. A deep, high resolution pattern requires more pliancy than a shallow, low resolution pattern. The amount of PTFE required to give the desired degree of pliancy is again dependent upon particle size, shape and distribution of the solid particulate material. Spherical particles of about 0.1 to 45 microns in diameter retain pliancy while employing about 0.5 to 5 volume percent fibrillated PTFE. Coarse angular particles of about 30 to 300 microns in diameter retain pliancy while employing about 3 to 10 volume percent fibrillated PTFE. These volume percents are fibrillated PTFE. There could, for instance, be 20 volume percent PTFE in the structure of which only half is fibrillated. Preferably the total amount of PTFE used will be no higher than 20 (more preferably 15) volume percent. Preferably the minimum amount of PTFE will be no less than 1.0 (more preferably 2.0) volume percent. Cloth pliancy is also a function of working. Working can vary widely and depends on many factors. The smaller the amount of PTFE and the larger the particle size of solid particulate material the more the working will be, and conversely, for best results. In general, for best results one will cross-roll only until the filled PTFE cloth has just enough pliancy to handle.

In the embodiment of this invention where the embossed article is prepared by placing two cloths on a substrate (for instance as in Example 2), e.g. where one cloth contains a brazing alloy and the other cloth contains material such as an abrasive (e.g. tungsten carbide) desirably the brazing alloy cloth will be placed on the substrate and the tungsten carbide cloth placed upon the brazing alloy cloth (instead of the converse) with the desired pattern being embossed in or on the tungsten carbide. This gives better replication. When the assembly is heated to sinter, the PTFE burns out, the brazing alloy melts and infuses into the tungsten carbide layer and wets it. Absence of PTFE in the final product is shown by microscopic examinations of a cross section thereof. Upon allowing to cool, the tungsten carbide-filled brazing alloy is metallurgically bonded to the substrate. Thus the tungsten carbide may be considered a filler and the brazing alloy a matrix. The matrix can be any of said solid particulate substances disclosed hereinbefore which has a lower melting point or solidus temperature than the substrate and which is characterized as wetting the filler. Preferably the matrix is an alloy such as e.g. various iron-based, nickel-based and cobalt-based alloys, and the like. The filler can be an intermetallic compound (abrasive) or any other particulate material disclosed hereinbefore as long as (1) it is wet by liquid matrix and (2) remains solid in liquid matrix. The matrix must have a lower melting point or solidus temperature than the substrate or filler.

The term substrate as used herein is intended to include a mere support for the filled PTFE cloth during the preparation of the embossed article as well as such a support which later becomes metallurgically bonded and an integral part of the embossed article.

In the embodiment described above, preferably one cloth is on top of the other. However, the cloths can be spaced apart from each other, and in that event the brazing alloy still infuses into the filler cloth.

The use of two cloths to prepare coated, but not embossed, articles is described in U.S. Pat. No. 3,743,556 of Breton, Wolf, Worden and Bailey.

In the event it is desired that the substrate not only serve as a support for the cloths during preparation of the embossed article but also become metallurgically bonded to and an integral part thereof, an adhering substrate is used. That is, a substrate which, due to its composition or treatment to which subjected, will permit metallurgical bonding to occur. However, if it is desired that the substrate serve only as a support during preparation of the embossed article and not become metallurgically bonded thereto and an integral part thereof, then a non-adhering substrate is used. That is, a substrate is used which, due to its composition or treatment to which subjected, will not permit metallurgical or mechanical bonding to occur. Examples of non-adhering materials include graphite, aluminum oxide and the like. An example of treating to render non-adhering includes coating a low carbon steel with a slurry of magnesium hydroxide.

Although the thickness of the initial filled PTFE cloth is not critical, preferably it will be at least about two times and more preferably at least about three times greater than the depth of the embossing.

Of course the substrate, whether for adhering support (coating) of for non-adhering support, should remain substantially rigid and not distort much in the sintering temperature ranges employed. The adhering substrates should be capable of being wet by the brazing alloy. The "Brazing Manual", American Welding Society, United Engineering Center, 345 East 47th Street, New York, New York, 1963, is a good reference on the wetting of metals by brazing alloys. Also applicable adhering substrates are ceramics capable of being wet by brazing alloys. Surface treatments of ceramics which enhance wetting by metals are well known.

Any means of heating may be employed to sinter. One means includes electrical by contacting the substrate with an electrode connected to a source of high amperage electrical power, contacting the filled PTFE cloth or cloths with a second electrode also connected to said power source and passing an electrical current through the substrate and the cloths for a short period of time. This means of heating to prepare coated, but not embossed, articles is disclosed in U.S. Pat. No. 3,778,586 of Breton and Worden. This may be referred to as resistance fusion. This is also one illustration wherein the heating means can also serve simultaneously as the shaping tool for forming the embossed pattern. In this event the surface of the electrode contacting the cloths contains the desired pattern to be embossed. Of course the embossing electrode is of non-adhering material e.g. graphite, cooled copper and the like, or is treated to render it non-adhering. Preferably the cloths is subjected to a moderate pressure of 1 to 5000 psi, more preferably 5 to 100 psi, during heating. This decreases the electrical resistance of the particulate material.

It is obvious that sintering will be carried out in a suitable atmosphere, and the artisan knows which to select depending on the circumstances.

This invention has numerous practical applications. These include, but are not limited to, embossing rolls of all types, printing rolls, cutting tools (e.g. files, burrs, drills and the like), collets, gripper jaws, threads, scribes, gears.

One major advantage of such application e.g. as embossing rolls is that many cloths with various embossing patterns can be used for a single embossing roll instead of the present practice where the embossing is an integral part of the roll. Thus, with this invention the changeover time from one pattern to another is substantially reduced.

The disclosures of the above-identified U.S. Pat. No. 3,864,124, U.S. Pat. No. 3,743,556, and U.S. Pat. No. 3,778,586 are hereby incorporated herein by reference.

The foregoing detailed description has been given for clarity of understanding only and no unnecessary limitations are to be understood therefrom. The invention is not limited to the exact details shown and described for obvious modifications will occur to those skilled in the art.

We claim:

1. A process of preparing an article having an embossed pattern on at least one surface thereof which comprises mixing solid particulate braze alloy material and particulate polytetrafluoroethylene resin to provide a first mixture and mixing solid particulate filler material and particulate polytetrafluoroethylene resin to provide a second mixture, each of the mixtures containing about 1 to about 20 volume percent polytetrafluoroethylene resin, mechanically working each of the mixtures until the polytetrafluoroethylene fibrillates and the resulting fibrils interconnect and entrap solid particulate material to provide non-woven cloths having handleability and flexibility, folding each of the cloths, mechanically working each of the folded clothes along a crosswise axis to the direction of the initial mechanical working step, forming a surface of the cloth containing filler material into a pattern to be replicated, and heating the cloths while contiguous to each other to a temperature sufficient to drive off polytetrafluoroethylene and infiltrate braze alloy into the cloth containing filler material by melting braze alloy to provide an article having an embossed pattern on a surface thereof.

2. The process of claim 1 wherein at least two particulate filler materials are employed with polytetrafluoroethylene resin to provide a second mixture.

3. The process of claim 1 wherein the particulate filler material is selected from the group consisting of ceramics, metals, intermetallic compounds, plastics, or combinations thereof.

4. The process of claim 3 wherein the particulate material is an intermetallic abrasive material selected from the group consisting of metallic carbides, nitrides, borides and silicides, or combinations thereof and the braze alloy is selected from the group consisting of iron base, nickel base, and cobalt base alloys.

5. The process of claim 4 wherein the intermetallic abrasive is tungsten carbide, chromium carbide, tantalum carbide, titanium carbide, molybdenum carbide, silicon carbide, boron carbide or diamond.

6. The process of claim 1 wherein the pattern is formed with a die which is an electrode which, together with another electrode, also serves as a means for heating cloth.

7. The process of claim 1 wherein the amount of fibrillated polytetrafluoroethylene resin is 1 to 10% by volume of the mixture of resin and solid particulate filler material.

8. The process of claim 1 wherein the diameter of said solid particulate filler material is not in excess of about 25% of the resolution desired of the embossed pattern.

9. The process of claim 1 wherein the diameter of said solid particulate filler material is about 0.1 to 300 microns.

10. The process of claim 1 including the further steps of, prior to forming a surface of the cloth containing filler material, placing the cloths on a substrate, forming a surface of the cloth containing filler material into a pattern to be replicated, and heating the cloths to a temperature sufficient to drive off polytetrafluoroethylene and infiltrate braze alloy into the cloth containing filler material by melting braze alloy to provide an embossed pattern over the substrate.

11. The process of claim 10, wherein an adhering substrate is employed and the brazing alloy forms a bond with the substrate.

* * * * *

UNITED STATES PATENT OFFICE
CERTIFICATE OF CORRECTION

PATENT NO. : 3,917,149
DATED : November 4, 1975
INVENTOR(S) : Ernest J. Breton; Jack D. Wolf: Dexter Worden: John T. Bailey It is certified that error appears in the above-identified patent and that said Letters Patent are hereby corrected as shown below:

Col. 5, line 49 insert "as" after such

Col. 5, line 59 delete "such as" and substitute therefore ---in---

Signed and Sealed this tenth Day of February 1976

[SEAL]

Attest:

RUTH C. MASON
Attesting Officer

C. MARSHALL DANN
Commissioner of Patents and Trademarks